United States Patent
Fujitake et al.

(10) Patent No.: US 11,566,570 B1
(45) Date of Patent: Jan. 31, 2023

(54) VEHICLE CONTROL SYSTEM

(71) Applicant: TOYOTA JIDOSHA KABUSHIKI KAISHA, Toyota (JP)

(72) Inventors: Yoshinori Fujitake, Toyota (JP); Suguru Kumazawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/809,148

(22) Filed: Jun. 27, 2022

(30) Foreign Application Priority Data

Jul. 12, 2021 (JP) .............................. JP2021-114820

(51) Int. Cl.
  *F02D 41/14* (2006.01)
  *F02D 41/00* (2006.01)
  *F02D 41/02* (2006.01)

(52) U.S. Cl.
  CPC ..... *F02D 41/0085* (2013.01); *F02D 41/0087* (2013.01); *F02D 41/027* (2013.01); *F02D 41/1475* (2013.01); *F02D 2200/101* (2013.01); *F02D 2200/503* (2013.01)

(58) Field of Classification Search
  CPC ............. F02D 41/0085; F02D 41/0087; F02D 41/027; F02D 41/1475; F02D 2200/101; F02D 2200/503

USPC .............. 123/198 f, 481, 179.3, 179.4, 436; 701/103–105, 110, 111, 112, 113

See application file for complete search history.

(56) References Cited

FOREIGN PATENT DOCUMENTS

| JP | 2001-207886 A | | 8/2001 | |
| JP | 3576286 B2 | * | 10/2004 | ............ F02B 61/045 |
| JP | 2005027466 | * | 1/2005 | ............... B60K 6/04 |
| JP | 2013086523 | * | 5/2013 | ............. F02D 41/04 |

* cited by examiner

*Primary Examiner* — Hai H Huynh
(74) *Attorney, Agent, or Firm* — Oblon, McClelland, Maier & Neustadt, L.L.P.

(57) ABSTRACT

When an amount of particulate matters (PM) collected by a gasoline particulate filter (GPF) increases, a control processing unit (CPU) of an engine electronic control unit (ENG ECU) stops combustion control of some cylinders and executes a regeneration process to cause air-fuel ratios of air-fuel mixtures in the remaining cylinders to be richer than a stoichiometric air-fuel ratio. A CPU of a hybrid electric vehicle electronic control unit (HV ECU) increases a target rotation speed of an internal combustion engine when the regeneration process is executed. When executing the regeneration process, the CPU increases a filling efficiency of the internal combustion engine.

6 Claims, 10 Drawing Sheets

VEHICLE CONTROL SYSTEM

CROSS-REFERENCE TO RELATED APPLICATION

This application claims priority to Japanese Patent Application No. 2021-114820 filed on Jul. 12, 2021, incorporated herein by reference in its entirety.

BACKGROUND

1. Technical Field

The present disclosure relates to a vehicle control system.

2. Description of Related Art

For example, Japanese Unexamined Patent Application Publication No. 2001-207886 (JP 2001-207886 A) describes a hybrid electric vehicle in which an internal combustion engine and a motor can apply power to drive wheels. The control device described in this document stops combustion control in some cylinders of the internal combustion engine when the required output value for the internal combustion engine is lower than the set value. At this time, this control device executes control in which the motor compensates for the decrease in output of the internal combustion engine caused by the stop of the combustion control.

SUMMARY

In the case of the above control device, to compensate for the decrease in the output of the internal combustion engine, a motor is required and the capacity of the battery needs to have a margin to supply the motor with enough electric power to compensate for the decrease in the output.

Hereinafter, means for solving the above problems and their operations and effects will be described.

1. Provided is a vehicle control system that is applied to a vehicle including an internal combustion engine including a plurality of cylinders, and that executes a stop process and an operation point change process. The stop process is a process for stopping combustion control in some of the cylinders. The operation point change process is a process of changing an operation point of the internal combustion engine when the stop process is executed. The operation point is a point defined by a rotation speed of a crank shaft of the internal combustion engine and a filling efficiency. The operation point changed in the operation point change process is an operation point in which the rotation speed of the crank shaft of the internal combustion engine is higher than the rotation speed of the crank shaft of the internal combustion engine when the operation point is not changed.

In the above configuration, when the stop process is executed, both the rotation speed and the filling efficiency are increased in the operation point change process. Thus, the amount of combustion energy generated per unit time increases due to the combustion control in the cylinders not subjected to the stop process. Therefore, the decrease in the output of the internal combustion engine due to the stop process can be suppressed by the internal combustion engine itself.

Here, the increase in the amount of combustion energy generated per unit time in the cylinders not subjected to the stop process can be realized by only one of the following: increasing the filling efficiency; and increasing the rotation speed. However, when the filling efficiency is already high to some extent, the decrease in the output cannot be sufficiently compensated only by increasing the filling efficiency. In view of this, in the above configuration, by increasing the rotation speed, it is possible to sufficiently suppress the decrease in the output even at an operation point where the filling efficiency is already high.

2. In the vehicle control system according to 1 above, the operation point changed in the operation point change process is an operation point in which both the rotation speed of the crank shaft and the filling efficiency are higher than the rotation speed of the crank shaft and the filling efficiency when the operation point is not changed.

If the rotation speed is greatly increased, the noise perceived by the user may increase. In view of this, in the above configuration, by increasing both the filling efficiency and the rotation speed, a suitable compromise between sufficiently suppressing the decrease in the output and suppressing the increase in noise of the internal combustion engine can be achieved.

3. In the vehicle control system according to 2 above, the vehicle control system executes a required engine output setting process and an engine operation process. The required engine output setting process includes an engine base value setting process and a correction process. The engine base value setting process is a process of setting a base value of a required engine output according to an accelerator operation amount. The required engine output is an output required for the internal combustion engine. The correction process is a process of increasing and correcting the required engine output with respect to the base value when the stop process is executed. The engine operation process is a process of operating an operation unit of the internal combustion engine that adjusts the filling efficiency according to the required engine output.

In the above configuration, the filling efficiency is increased by operating the operation unit that adjusts the filling efficiency according to the required engine output that has been increased and corrected in the correction process.

4. In the vehicle control system according to 3 above, the internal combustion engine includes a post-processing device in an exhaust passage. The vehicle control system executes a regeneration process of the post-processing device and a decrease variable calculation process. The regeneration process includes the stop process and a rich combustion process. The rich combustion process is a process of adjusting a degree of enrichment of an air-fuel ratio of an air-fuel mixture in a cylinder not subjected to the stop process among the cylinders according to a temperature of the post-processing device. The decrease variable calculation process is a process of calculating a value of a decrease variable according to the degree of enrichment. The decrease variable is a variable indicating an amount of decrease in an output of the internal combustion engine due to the regeneration process. The correction process is a process of increasing and correcting the required engine output with respect to the base value according to the value of the decrease variable.

The torque generated by the combustion control can vary depending on the air-fuel ratio of the air-fuel mixture. Therefore, in the above configuration, the value of the decrease variable is calculated according to the degree of enrichment. By correcting the engine required torque according to the value of the decrease variable, it is possible to compensate for the decrease in the output due to the stop process with high accuracy.

5. In the vehicle control system according to 3 or 4 above, the vehicle includes a rotary electric machine. Power of the internal combustion engine and power of the rotary electric machine are considered applicable to drive wheels. In the above configuration, since the rotary electric machine can apply power to the drive wheels, it is conceivable that the rotary electric machine compensates for the decrease in the output of the internal combustion engine due to the stop process. However, in that case, depending on the state of means for supplying electric power to the rotary electric machine, it may not be possible to sufficiently compensate for the decrease in the output. In view of this, according to the above correction process, it is possible to compensate for the decrease in the output regardless of the state of the means for supplying electric power to the rotary electric machine.

6. In the vehicle control system according to 5 above, the rotary electric machine is a second rotary electric machine. The vehicle includes a planetary gear mechanism, a first rotary electric machine, and a battery. The planetary gear mechanism includes a first rotation body, a second rotation body, and a third rotation body. The first rotation body is mechanically connected to a rotation shaft of the first rotary electric machine. The second rotation body is mechanically connected to a rotation shaft of the second rotary electric machine. The third rotation body is mechanically connected to the crank shaft of the internal combustion engine. The first rotation body and the third rotation body are mechanically connected to the drive wheels via the second rotation body. The battery exchanges electric power with the first rotary electric machine and the second rotary electric machine. The engine base value setting process is a process of setting the base value according to required charge and discharge power for the battery as well as the accelerator operation amount. The required engine output setting process includes a feedback process. The feedback process is a process of operating the required engine output to perform feedback control of an actual charge and discharge power of the battery to the required charge and discharge power.

In the above configuration, if the decrease in the output due to the stop process is compensated by the rotary electric machine outside the required charge and discharge power, the output of the internal combustion engine is increased by the feedback process. Therefore, even by the feedback process, it is possible to compensate for the decrease in the output due to the stop process by increasing the output of the internal combustion engine. However, since a response delay occurs in the feedback process, depending on the charge rate of the battery, there may be a period in which the decrease in the output of the internal combustion engine cannot be sufficiently compensated due to the response delay in the feedback process. Further, there is a tendency that an upper limit value is set for the operation amount of the feedback process. In that case, when compensating for the decrease in the output due to the stop process by the feedback process, there is a possibility that the charge and discharge power of the battery cannot be controlled with high accuracy. In view of this, in the above configuration, it is possible to quickly compensate for the decrease in the output and to control the charge and discharge power of the battery with high accuracy.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Hereinafter, a first embodiment will be described with reference to the drawings.

Figure 1:
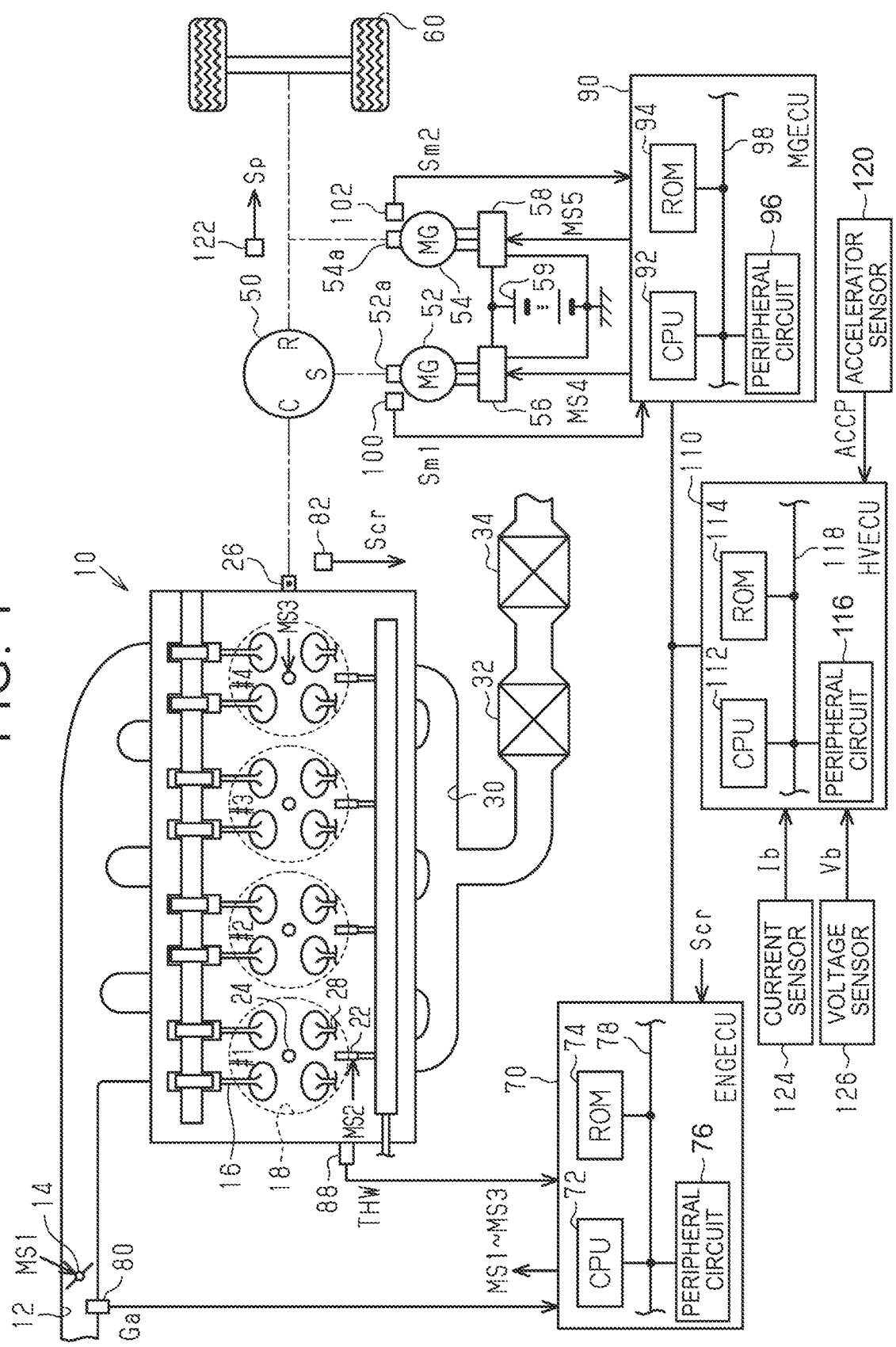
FIG. 1 is a diagram showing a configuration of a control system and a drive system according to a first embodiment.

As shown in FIG. 1, an internal combustion engine 10 includes four cylinders #1 to #4. A throttle valve 14 is provided in an intake passage 12 of the internal combustion engine 10. The air taken into the intake passage 12 flows into a combustion chamber 18 when an intake valve 16 opens. Fuel is injected into the combustion chamber 18 from an in-cylinder injection valve 22. The air-fuel mixture that is a mixture of the air in the combustion chamber 18 and the fuel is subjected to combustion with the spark discharge of a spark plug 24. The combustion energy generated at that time is converted into the rotation energy of a crank shaft 26.

The air-fuel mixture subjected to combustion in the combustion chamber 18 is discharged to an exhaust passage 30 as exhaust gas when an exhaust valve 28 is opened. The exhaust passage 30 is provided with a three-way catalyst 32 having an oxygen storage capacity and a gasoline particulate filter (GPF 34). In the present embodiment, as the GPF 34, a filter in which a three-way catalyst is supported on a filter for collecting particulate matter (PM) is exemplified.

The crank shaft 26 is mechanically connected to a carrier C of a planetary gear mechanism 50 constituting a power splitting device. A rotation shaft 52*a* of a first motor generator 52 is mechanically connected to a sun gear S of the planetary gear mechanism 50. A rotation shaft 54*a* of a second motor generator 54 and drive wheels 60 are mechanically connected to a ring gear R of the planetary gear mechanism 50. An alternating current (AC) voltage is applied to a terminal of the first motor generator 52 by an inverter 56. Further, an AC voltage is applied to a terminal of the second motor generator 54 by an inverter 58. The inverters 56, 58 convert the terminal voltage of a battery 59, which is a direct current (DC) voltage source, into an AC voltage. In the present embodiment, a secondary battery such as a lithium ion secondary battery is assumed as the battery 59.

An engine electronic control unit (ENG ECU) 70 controls the internal combustion engine 10, and in order to control the torque as the control amount, the exhaust component ratio, and the like, the ENG ECU 70 operates operation units of the internal combustion engine 10 such as the throttle valve 14, the in-cylinder injection valve 22, and the spark plug 24. FIG. 1 shows operation signals MS1 to MS3 for the throttle valve 14, the in-cylinder injection valve 22, and the spark plug 24.

The ENG ECU 70 refers to the intake air amount Ga detected by an air flow meter 80 and the output signal Scr of a crank angle sensor 82 in order to control the control amount. Further, the ENG ECU 70 refers to the coolant temperature THAW detected by a coolant temperature sensor 88.

A central processing unit (CPU) 72, a read-only memory (ROM) 74, and a peripheral circuit 76 included in the ENG ECU 70 can communicate with each other via a communication line 78. Here, the peripheral circuit 76 includes a circuit that generates a clock signal defining the internal operation, a power supply circuit, a reset circuit, and the like. The ENG ECU 70 controls the control amount when the CPU 72 executes the program stored in the ROM 74.

The ENG ECU 70 can further communicate with a motor generator electronic control unit (MG ECU) 90 and a hybrid electric vehicle electronic control unit (HV ECU) 110 that are externally provided.

The MG ECU 90 controls the first motor generator 52, and operates the inverter 56 to control the rotation speed that is the control amount. The MG ECU 90 also controls the second motor generator 54, and operates the inverter 58 to control the torque that is the control amount. FIG. 1 shows the operation signals MS4, MS5 of the inverters 56, 58. The MG ECU 90 refers to the output signal Sm1 of a first rotation angle sensor 100 that detects the rotation angle of the first motor generator 52 in order to control the control amount of the first motor generator 52. The MG ECU 90 also refers to the output signal Sm2 of a second rotation angle sensor 102 that detects the rotation angle of the second motor generator 54 in order to control the control amount of the second motor generator 54.

A CPU 92, a ROM 94, and a peripheral circuit 96 included in the MG ECU 90 can communicate with each other via a communication line 98. The MG ECU 90 controls the control amount when the CPU 92 executes the program stored in the ROM 94.

The HV ECU 110 controls a hybrid system including the internal combustion engine 10, the first motor generator 52, and the second motor generator 54. The HV ECU 110 outputs a command value for the internal combustion engine 10 to the ENG ECU 70. The HV ECU 110 outputs the command values for the first motor generator 52 and the second motor generator 54 to the MG ECU 90. In order to output the command values, the HV ECU 110 refers to the accelerator operation amount ACCP, which is the amount of depression of the accelerator pedal detected by an accelerator sensor 120. The HV ECU 110 also refers to the output signal Sp of an output side rotation angle sensor 122 that detects the rotation angle of the ring gear R. The HV ECU 110 also refers to the charge and discharge current Ib of the battery 59 detected by a current sensor 124 and the terminal voltage Vb of the battery 59 detected by a voltage sensor 126. A CPU 112, a ROM 114, and a peripheral circuit 116 included in the HV ECU 110 can communicate with each other via a communication line 118. The HV ECU 110 calculates a command value when the CPU 112 executes a program stored in the ROM 114, and then outputs the calculated command value to the outside.

In the following, among the processes executed by the system shown in FIG. 1, the regeneration process of the GPF 34, the command process performed by the HV ECU 110, and the operation process of the throttle valve 14 will be described in detail.

Regeneration Process of GPF 34

Figure 2:
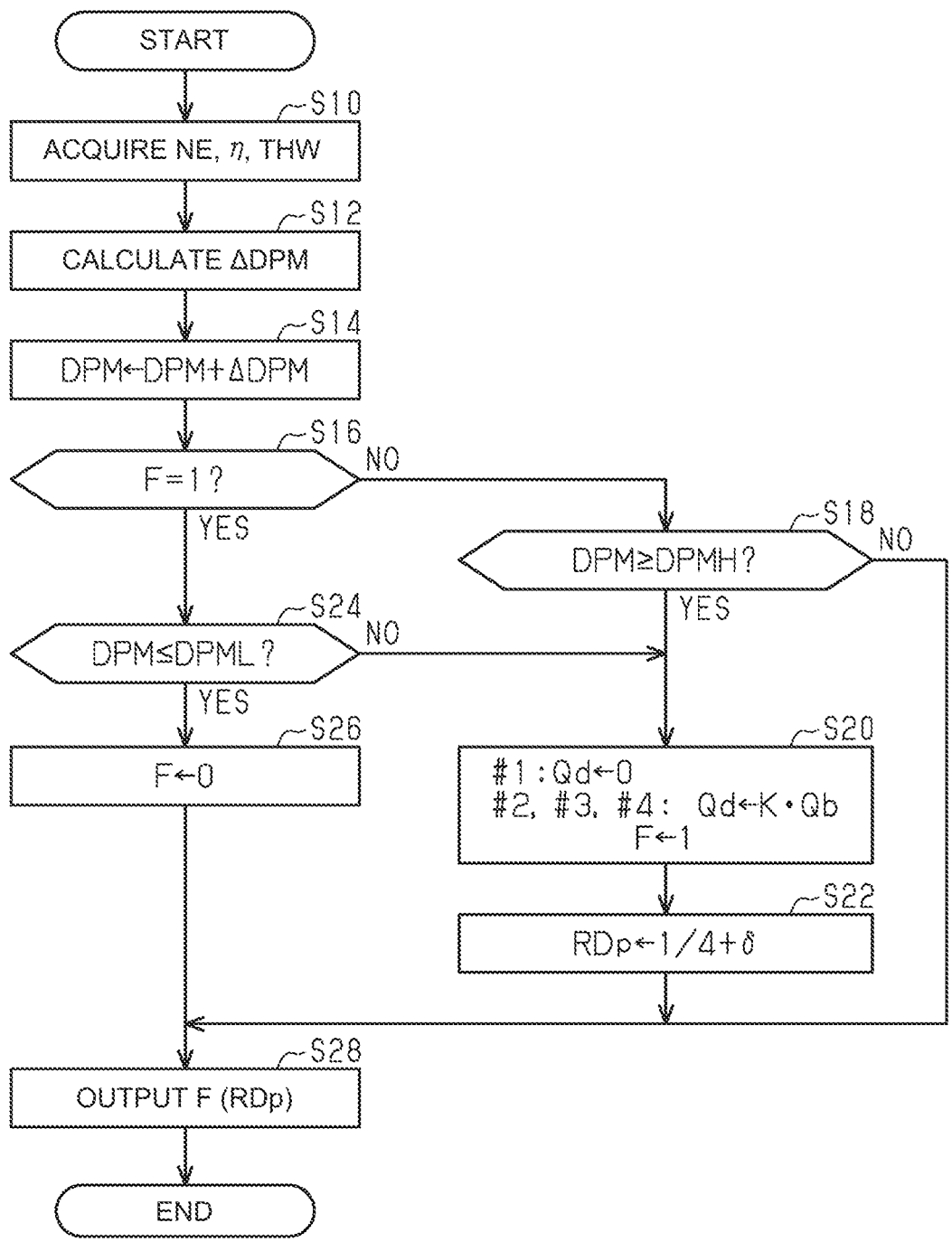
FIG. 2 is a flowchart showing a procedure of processes executed by the control system according to the first embodiment.

FIG. 2 shows the procedure of the regeneration process. The process shown in FIG. 2 is realized when the CPU 72 repeatedly executes the program stored in the ROM 74 of the ENG ECU 70, for example, at a predetermined cycle. In the following, the step number of each process is represented by a number prefixed with "S".

In the series of processes shown in FIG. 2, the CPU 72 first acquires the engine rotation speed NE, the filling efficiency η, and the coolant temperature THW (S10). Next, the CPU 72 calculates the update amount ΔDPM of the accumulated amount DPM based on the engine rotation speed NE, the filling efficiency η, and the coolant temperature THW (S12). Here, the accumulated amount DPM is the amount of the PM collected in the GPF 34. Specifically, the CPU 72 calculates the amount of the PM in the exhaust gas discharged to the exhaust passage 30 based on the engine rotation speed NE, the filling efficiency η, and the coolant temperature THW. Further, the CPU 72 calculates the temperature of the GPF 34 based on the engine rotation speed NE and the filling efficiency η. Then, the CPU 72 calculates the update amount ΔDPM based on the amount of the PM in the exhaust gas and the temperature of the GPF 34. At the time of executing the process of S20 described later, the temperature of the GPF 34 and the update amount ΔDPM may be calculated based on the increase coefficient K.

Next, the CPU 72 updates the accumulated amount DPM according to the update amount ΔDPM (S14). Subsequently, the CPU 72 determines whether the flag F is "1" (S16). The flag F being "1" indicates that the temperature raising process for combusting and removing the PM in the GPF 34 is being executed, while the flag F being "0" indicates that the temperature raising process is not being executed. When the CPU 72 determines that the value is "0" (S16: NO), the CPU 72 determines whether the accumulated amount DPM is equal to or greater than the regeneration execution value DPMH (S18). The regeneration execution value DPMH is set to a value at which a large amount of the PM is collected by the GPF 34 and it is desired to remove the PM.

When the CPU 72 determines that the accumulated amount DPM is equal to or greater than the regeneration execution value DPMH (S18: YES), the CPU 72 executes the temperature raising process and substitutes "1" into the flag F (S20). As the temperature raising process according to the present embodiment, the CPU 72 stops the injection of fuel from the in-cylinder injection valve 22 of the cylinder #1 and makes the air-fuel ratios of the air-fuel mixtures in the combustion chambers 18 of the cylinders #2, #3, #4 richer than the stoichiometric air-fuel ratio. This process is firstly a process for raising the temperature of the three-way catalyst 32. That is, by discharging oxygen and uncombusted fuel to the exhaust passage 30, the uncombusted fuel is oxidized in the three-way catalyst 32 and the temperature of the three-way catalyst 32 is raised. This process is secondly a process for raising the temperature of the GPF 34 and supplying oxygen to the high-temperature GPF 34 to oxidatively remove the PM collected by the GPF 34. That is, when the temperature of the three-way catalyst 32 becomes high, the temperature of the GPF 34 rises due to the high-temperature exhaust gas flowing into the GPF 34. When oxygen flows into the high-temperature GPF 34, the PM collected by the GPF 34 is oxidatively removed.

Specifically, the CPU 72 substitutes "0" into the required injection amount Qd for the in-cylinder injection valve 22 of the cylinder #1. On the other hand, the CPU 72 substitutes a value obtained by multiplying the base injection amount Qb by the increase coefficient K into the required injection amount Qd of the cylinders #2, #3, #4. The base injection amount Qb is a fuel amount for setting the air-fuel ratio of the air-fuel mixture in the combustion chamber 18 to the stoichiometric air-fuel ratio.

The CPU 72 sets the increase coefficient K to a value in which the amount of the uncombusted fuel in the exhaust gas discharged from the cylinders #2, #3, #4 into the exhaust passage 30 is equal to or less than an amount that reacts with the oxygen discharged from the cylinder #1 in just proportion. Specifically, the CPU 72 sets the increase coefficient K to a larger value when the temperature of the GPF 34 is low than when the temperature of the GPF 34 is high.

Then, the CPU 72 substitutes the value obtained by adding a predetermined amount δ to "¼" into the decrease variable RDp (S22). The decrease variable RDp is a variable indicating the decrease rate of the output of the internal combustion engine 10 due to the regeneration process. In the process of S22, since the combustion control is stopped only in the cylinder #1, it is considered that the output is approximately "¼" as compared with the case where the combustion control is not stopped. However, the output actually tends to be smaller than "¼" due to the difference from the case where the combustion control is executed in all of the cylinders #1 to #4. That amount is therefore expressed by a predetermined amount δ. The predetermined amount δ is a negative value.

When the CPU 72 determines that the flag F is "1" (S16: YES), the CPU 72 determines whether the accumulated amount DPM is equal to or less than the stop lower limit guard value DPML (S24). The stop lower limit guard value DPML is set to a value at which the amount of the PM collected in the GPF 34 is sufficiently small and the regeneration process may be stopped. When the CPU 72 determines that the accumulated amount DPM is larger than the stop lower limit guard value DPML (S24: NO), the CPU 72 shifts to the process of S20.

On the other hand, when the accumulated amount DPM is equal or less than the stop lower limit guard value DPML (S24: YES), the CPU 72 stops the process of S20 and substitutes "0" into the flag F (S26).

When the process of S22, S26 is completed, the CPU 72 outputs the value of the flag F to the HV ECU 110 (S28). When the flag F is "1", the CPU 72 outputs the value of the decrease variable RDp to the HV ECU 110 together with the value of the flag F.

When the process of S28 is completed, the CPU 72 temporarily ends the series of processes shown in FIG. 2.

Command Process Performed by HV ECU 110

Figure 3:
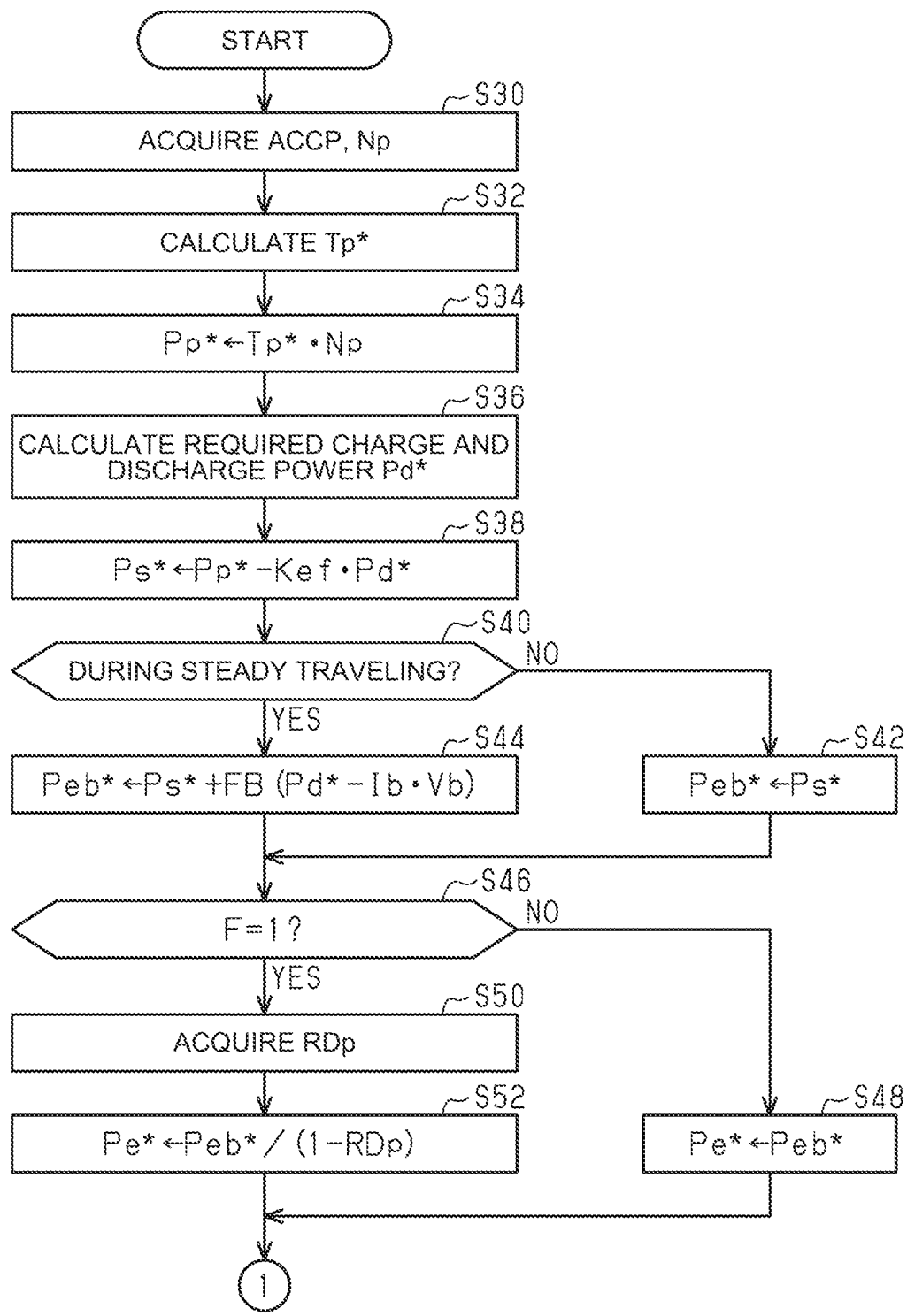
FIG. 3 is a flowchart showing a procedure of processes executed by the control system according to the first embodiment.
Figure 4:
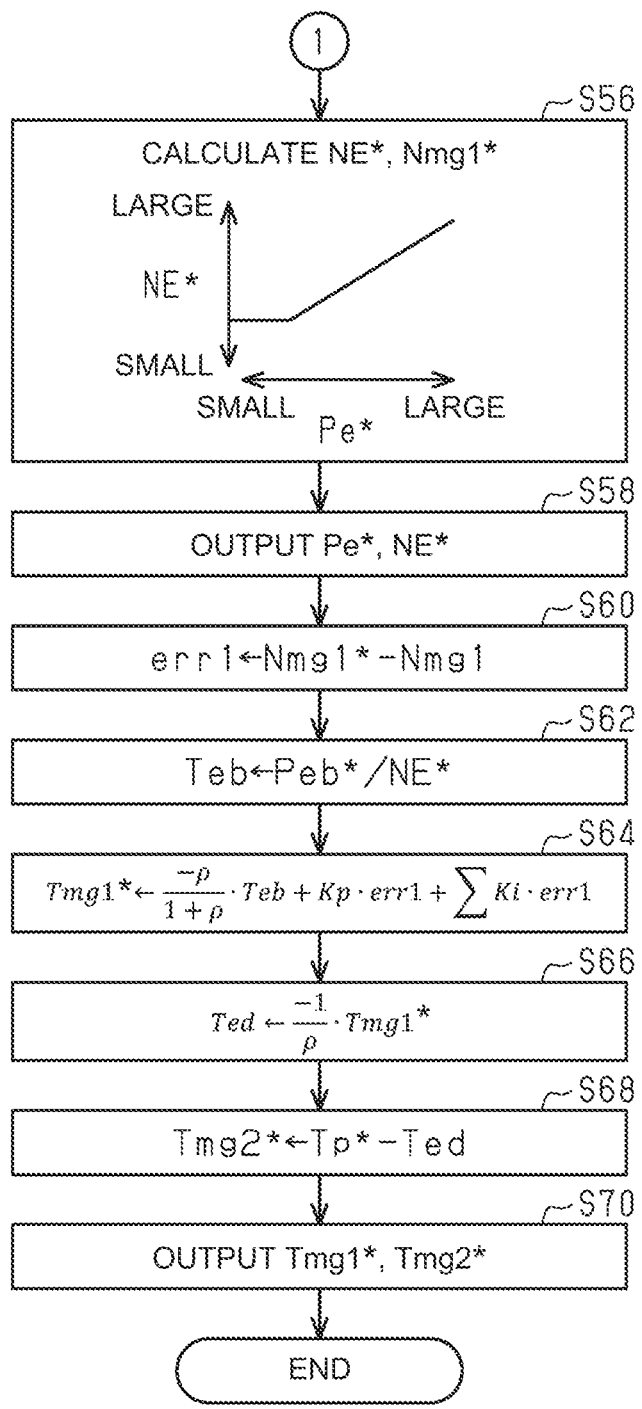
FIG. 4 is a flowchart showing a procedure of processes executed by the control system according to the first embodiment.

FIGS. 3 and 4 show the procedure of the command process performed by the HV ECU 110. The processes shown in FIGS. 3 and 4 are realized when the CPU 112 repeatedly executes the program stored in the ROM 114, for example, at a predetermined cycle.

In the series of processes shown in FIGS. 3 and 4, the CPU 112 first acquires the accelerator operation amount ACCP and the output side rotation speed Np (S30). The output side rotation speed Np is the rotation speed of the ring gear R. In other words, the output side rotation speed Np is a variable that indicates the vehicle speed. The output side rotation speed Np is calculated by the CPU 112 based on the output signal Sp.

The CPU 112 calculates the required drive torque Tp*, which is the torque required for the drive wheels 60, based on the accelerator operation amount ACCP and the output side rotation speed Np (S32). Next, the CPU 112 substitutes the product of the required drive torque Tp* and the output side rotation speed Np into the traveling output Pp* (S34). Then, the CPU 112 calculates the required charge and discharge power Pd* of the battery 59 based on the charge rate SOC of the battery 59 (S36). The required charge and discharge power Pd* is positive when discharge is performed. Specifically, when the charge rate SOC is equal to or less than a predetermined value, the CPU 112 sets the required charge and discharge power Pd* to a negative value in order to charge the battery 59. The charge rate SOC is calculated by the CPU 112 based on the charge and discharge current Ib and the terminal voltage Vb.

Next, the CPU 112 substitutes the value obtained by subtracting the product of the required charge and discharge power Pd* and the conversion efficiency Kef from the traveling output Pp* into the system output Ps* (S38). Then, the CPU 112 determines whether steady traveling is being performed (S40). For example, the CPU 112 determines that the steady traveling is being performed when the amount of change in the required drive torque Tp* per unit time is equal to or less than a predetermined amount and the amount of change in the output side rotation speed Np per unit time is equal to or less than a predetermined amount.

When the CPU 112 determines that steady traveling is not being performed (S40: NO), the CPU 112 substitutes the system output Ps* into the required engine output base value Peb* (S42). On the other hand, when the CPU 112 determines that steady traveling is being performed (S40: YES), the CPU 112 substitutes the value obtained by adding the feedback correction amount FB to the system output Ps* into the required engine output base value Peb* (S44). The feedback correction amount FB is an operation amount for performing feedback control of the charge and discharge power of the battery 59 to the required charge and discharge power Pd*. Here, the actual charge and discharge power of the battery 59 is calculated by the CPU 112 as the product of the charge and discharge current Ib and the terminal voltage Vb. When the value obtained by subtracting the actual charge and discharge power from the required charge and discharge power Pd* is smaller than the lower limit value, the CPU 112 increases and corrects the feedback correction amount FB by a predetermined amount. On the other hand, when the subtracted value is larger than the upper limit value, the CPU 112 reduces and corrects the feedback correction amount FB by a predetermined amount.

When the process of S42, S44 is completed, the CPU 112 determines whether the flag F is "1" (S46). When the CPU 112 determines that the flag F is "0" (S46: NO), the CPU 112 substitutes the required engine output base value Peb* into the required engine output Pe* (S48). On the other hand, when the CPU 112 determines that the flag F is "1" (S46: YES), the CPU 112 acquires the decrease variable RDp (S50). Then, the CPU 112 substitutes "Peb*/(1−RDp)" into the required engine output Pe* (S52).

When the process of S48, S52 is completed, the CPU 112 calculates the target engine rotation speed NE* and the first required rotation speed Nmg1* (S56 in FIG. 4). Here, the target engine rotation speed NE* is a target value of the engine rotation speed NE. The first required rotation speed Nmg1* is a required value of the first rotation speed Nmg1, which is the rotation speed of the rotation shaft 52a of the first motor generator 52. Specifically, the process of S56 is as follows.

First, the CPU 112 calculates the target engine rotation speed NE* based on the required engine output Pe*. This can be realized by performing a map calculation of the target engine rotation speed NE* by the CPU 112 in a state where the map data is stored in the ROM 114 in advance. Here, the map data is data in which the required engine output Pe* is an input variable and the target engine rotation speed NE* is an output variable. The map data is a set data of a discrete value of an input variable and a value of an output variable corresponding to each of the values of the input variable. In the map calculation, when the value of the input variable matches any of the values of the input variable in the map data, the corresponding value of the output variable in the map data may be used as the calculation result. Further, in the map calculation, when the value of the input variable matches none of the values of the input variable in the map data, the value obtained by interpolating the values of a plurality of output variables included in the map data may be used as the calculation result.

Next, the CPU 112 calculates the first required rotation speed Nmg1* based on the following equation.

$$NE^*=\{\rho/(1+\rho)\}\cdot Nmg1^*+\{1/(1+\rho)\}\cdot Np$$

Note that the planetary gear ratio $\rho$ in the above equation is a value obtained by dividing the number of teeth of the sun gear S by the number of teeth of the ring gear R.

Next, the CPU 112 outputs the required engine output Pe* and the target engine rotation speed NE* to the ENG ECU 70 (S58). Further, the CPU 112 substitutes the value obtained by subtracting the first rotation speed Nmg1 from the first required rotation speed Nmg1* into the error err1 (S60). The first rotation speed Nmg1 is calculated by the MG ECU 90 based on the output signal Sm1.

Next, the CPU 112 substitutes the value obtained by dividing the required engine output base value Peb* by the target engine rotation speed NE* into the engine torque base value Teb (S62).

Then, the CPU 112 calculates the first required torque Tmg1* (S64). The first required torque Tmg1* is the required torque for the first motor generator 52. The CPU 112 sets the sum of the open loop term and the feedback term as the first required torque Tmg1*. Here, the open loop term is "$\{-\rho/(1+\rho)\}\cdot Teb$". Here, "$-\rho/(1+\rho)$" is a coefficient for converting the torque of the carrier C into the torque of the sun gear S. The feedback term is an operation amount for feedback control of the first rotation speed Nmg1. The feedback term is the sum of the output of the proportional element and the output of the integration element. The output value of the proportional element is a value obtained by multiplying the error err1 by the proportional gain Kp. The output value of the integration element is an integrated value obtained by multiplying the error err1 by the integration gain Ki.

Next, the CPU 112 substitutes the value obtained by multiplying "$(-1)/\rho$" by the first required torque Tmg1* into the direct torque Ted (S66). Here, "$(-1)/\rho$" is a coefficient for converting the torque of the sun gear S into the torque of the ring gear R. The direct torque Ted is a calculated torque that is assumed to be applied to the ring gear R.

Next, the CPU 112 calculates the second required torque Tmg2* by subtracting the direct torque Ted from the required drive torque Tp* (S68). Here, the value obtained by subtracting the direct torque Ted from the required drive torque Tp* represents a shortage of the output of the ring gear R in setting the torque of the drive wheels 60 to the required drive torque Tp*.

Next, the CPU 112 outputs the first required torque Tmg1* and the second required torque Tmg2* to the MG ECU 90 (S70).

When the process of S70 is completed, the CPU 112 temporarily ends the series of processes shown in FIGS. 3 and 4.

Operation Process of Throttle Valve 14

Figure 5:
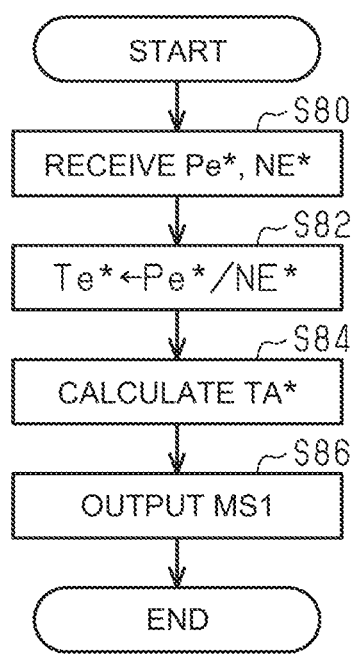
FIG. 5 is a flowchart showing a procedure of processes executed by the control system according to the first embodiment.

FIG. 5 shows a procedure of a process related to the operation of the throttle valve 14. The process shown in FIG. 5 is realized when the CPU 72 repeatedly executes the program stored in the ROM 74 of the ENG ECU 70, for example, at a predetermined cycle.

In the series of processes shown in FIG. 5, the CPU 72 first receives the required engine output Pe* and the target engine rotation speed NE* (S80). Then, the CPU 72 substitutes the value obtained by dividing the required engine output Pe* by the target engine rotation speed NE* into the engine required torque Te* (S82). Next, the CPU 72 calculates the throttle opening degree command value TA*, which is the command value of the opening degree of the throttle valve 14, based on the engine required torque Te* (S84). The throttle opening degree command value TA* calculated here is a value for setting the torque of the internal combustion engine 10 to the engine required torque Te* when the combustion control is executed in all of the cylinders #1 to #4. Then, the CPU 72 outputs an operation signal MS1 to the throttle valve 14 to control the opening degree of the throttle valve 14 to the throttle opening degree command value TA* (S86).

When the process of S86 is completed, the CPU 72 temporarily ends the series of processes shown in FIG. 5. Here, the operation and effect of the present embodiment will be described.

Figure 6:
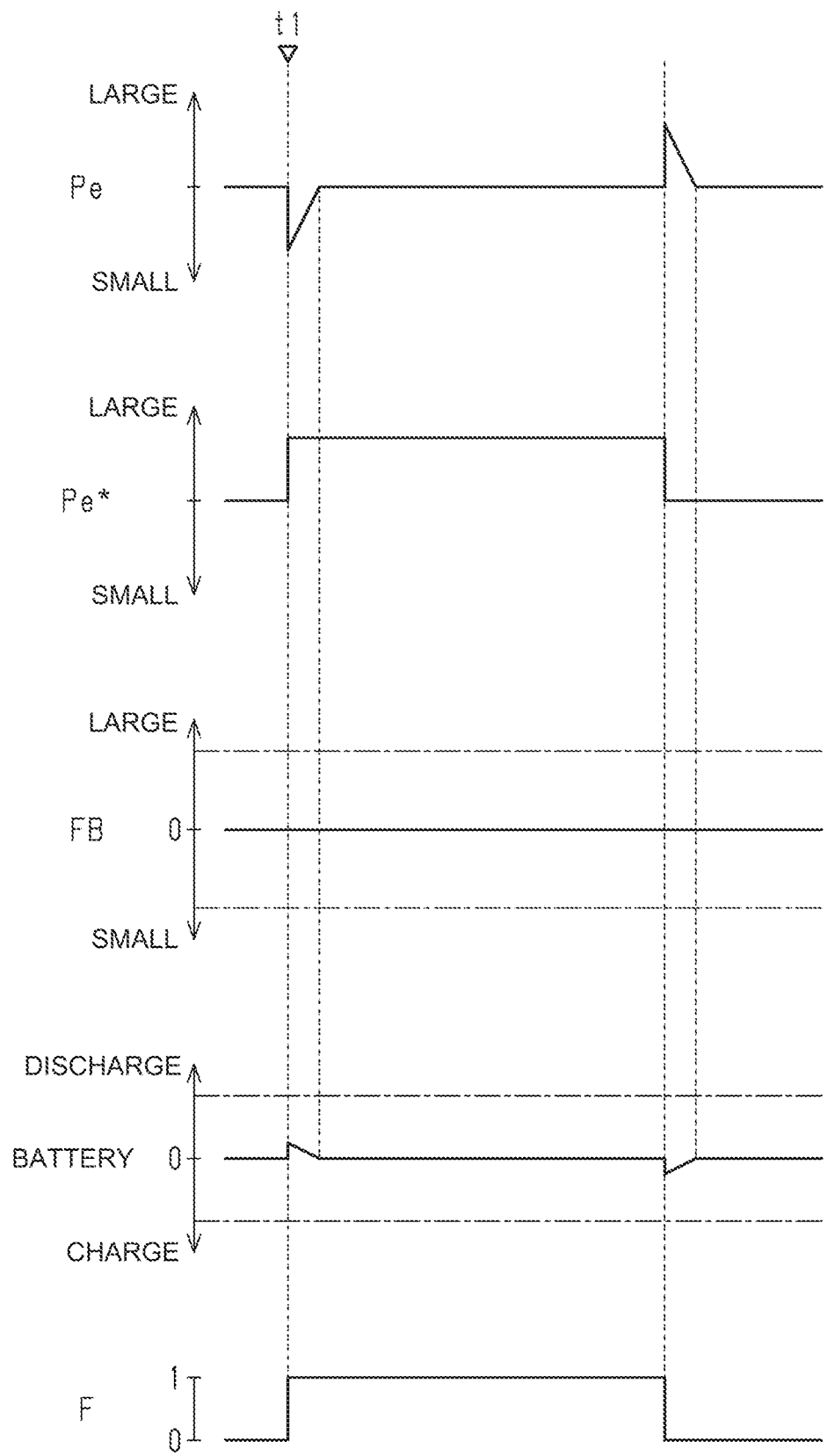
FIG. 6 is a time chart showing an operation of the first embodiment.

FIG. 6 illustrates transitions in the engine output Pe, the required engine output Pe*, the feedback correction amount FB, the charge and discharge state of the battery 59, and the flag F according to the present embodiment. The engine output Pe is the actual output of the internal combustion engine 10.

As shown in FIG. 6, when the regeneration process is executed at time t1, the CPU 112 of the HV ECU 110 increases the required engine output Pe* with respect to the required engine output base value Peb* based on the value of the decrease variable RDp. Then, the CPU 112 outputs the increased required engine output Pe* to the ENG ECU 70. The ENG ECU 70 calculates the engine required torque Te* according to the required engine output Pe*, and operates the throttle valve 14 based on the calculated engine required torque Te*. Here, the CPU 72 operates the throttle valve 14 so that the output of the internal combustion engine 10 becomes the required engine output Pe* when the combustion control is executed in all of the cylinders #1 to #4. Therefore, at time t1 when the combustion control is stopped in the cylinder #1 and after, the opening degree of the throttle valve 14 is expanded. That is, at time t1, the required engine output Pe* increases stepwise due to the decrease variable RDp. Therefore, the throttle opening degree command value TA* suitable for controlling the output of the internal combustion engine 10 to the required engine output Pe* increases stepwise. Therefore, the throttle valve 14 is operated so as to increase its opening degree.

Therefore, it is possible to suppress the engine output Pe from being insufficient due to the execution of the regeneration process. In FIG. 6, the engine output Pe is insufficient for a very short time at and after time t1, which is due to the delay in the response of the increase in the filling efficiency η to the increase in the opening degree of the throttle valve 14. At time t1, the engine torque base value Teb calculated by the process of S62 decreases. That is, since the target engine rotation speed NE* used in the process of S62 is calculated based on the required engine output Pe* increased due to the decrease variable RDp, the target engine rotation speed NE* increases. However, since the required engine output base value Peb* itself has not increased, the engine torque base value Teb decreases. As a result, the absolute value of the first required torque Tmg1* calculated in the process of S64 decreases. Therefore, the direct torque Ted decreases, and the second required torque Tmg2* increases. However, after that, by performing feedback control of the first rotation speed Nmg1 to the first required rotation speed Nmg1*, the absolute value of the first required torque Tmg1* increases. As a result, the direct torque Ted decreases, so that the second required torque Tmg2* decreases.

Figure 7:
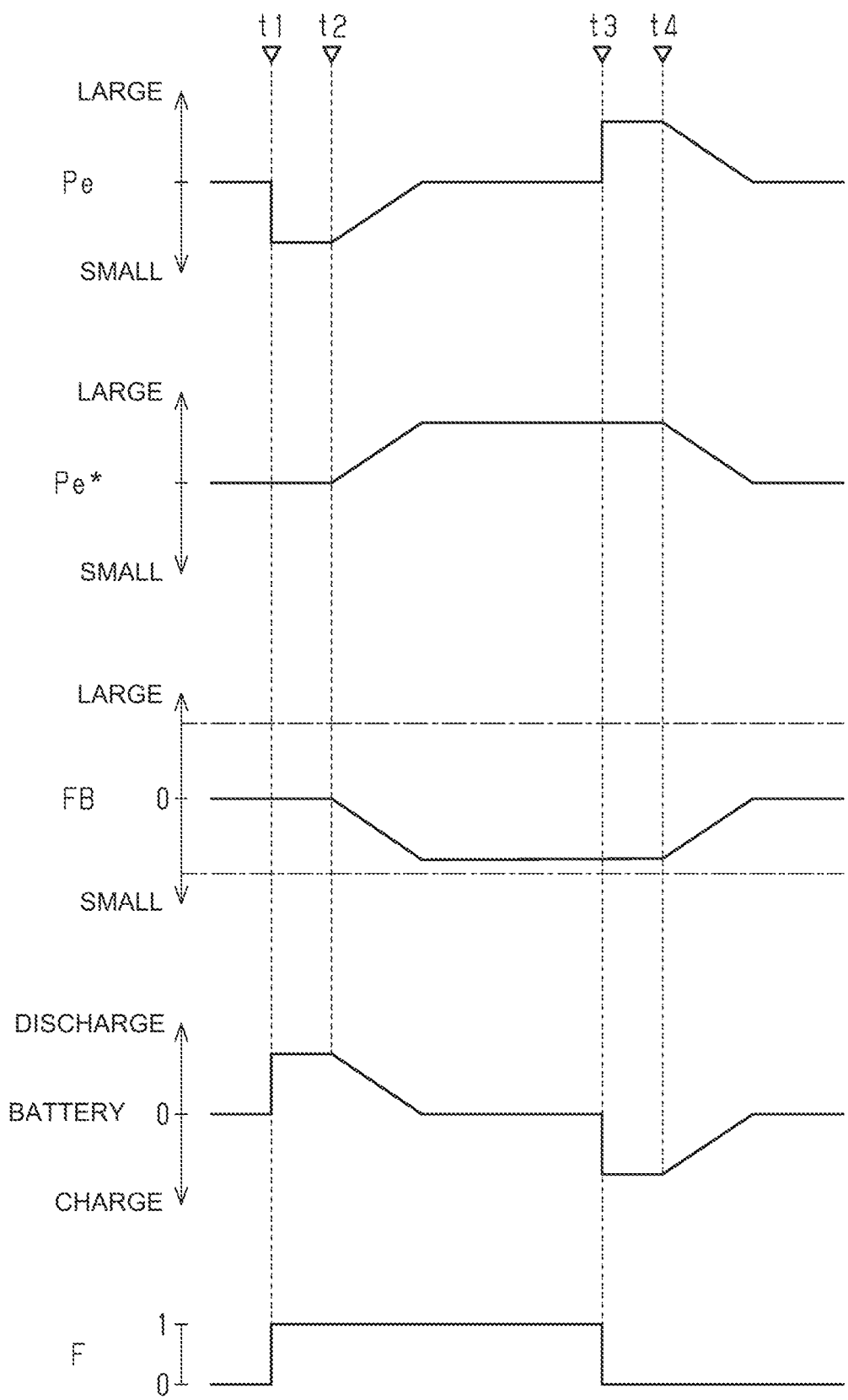
FIG. 7 is a time chart showing an operation of a comparative example.

FIG. 7 illustrates transitions in the engine output Pe, the required engine output Pe*, the feedback correction amount FB, the charge and discharge state of the battery 59, and the flag F in a comparative example in which the process of S50, S52 is not executed. Specifically, in the example shown in FIG. 7, an example in which "Peb*·RDp" is used instead of the required engine output base value Peb* in the process of S62 is shown.

As shown in FIG. 7, when the regeneration process is executed at time t1, the engine torque base value Teb calculated by the process of S62 decreases stepwise. As a result, the absolute value of the first required torque Tmg1* calculated in the process of S64 decreases stepwise. Therefore, the direct torque Ted decreases stepwise, and the second required torque Tmg2* increases stepwise. Therefore, as shown in FIG. 7, the discharge power of the battery 59 increases stepwise. After that, when it is determined at time t2 that steady traveling is being performed, the required engine output base value Peb* becomes a value obtained by adding the feedback correction amount FB to the system output Ps*. Therefore, the required engine output Pe* increases.

After that, when the regeneration process is stopped at time t3, the combustion control is executed in the cylinder #1, so that the engine output Pe increases to about "4/3" compared to that before the regeneration process is stopped. Further, the engine torque base value Teb calculated by the process of S62 increases stepwise. Therefore, the absolute value of the first required torque Tmg1* increases stepwise. Since the direct torque Ted increases stepwise, the second required torque Tmg2* decreases stepwise. Therefore, as shown in FIG. 7, the charge power of the battery 59 increases stepwise.

After that, when it is determined at time t4 that steady traveling is being performed, the required engine output base value Peb* becomes a value obtained by adding the feedback correction amount FB to the system output Ps*. Therefore, the required engine output Pe* decreases.

As described above, in the case of the comparative example, since the required engine output Pe* is not increased or decreased by the feedforward control with the start and end of the regeneration process, the need to adjust the traveling output Pp* by charge and discharge of the battery 59 occurs. However, since the upper limit value of the charge and discharge power of the battery 59 is limited by the charge rate SOC, the temperature of the battery 59, and the like, it is not always possible to control the traveling output Pp* by charge and discharge of the battery 59.

Further, when it is determined that steady traveling is being performed, the required engine output Pe* is increased or decreased by the feedback control of the required charge and discharge power Pd*. However, a response delay occurs in compensating, by the feedback control, for the change in the output of the internal combustion engine 10 due to the start and stop of the regeneration process. Further, as shown by the long dashed short dashed lines in FIG. 7, the feedback correction amount FB has an upper limit value and a lower limit value. Therefore, when the change in the output of the internal combustion engine 10 due to the stop and restart of the combustion control of one cylinder #1 is compensated, the absolute value of the feedback correction amount FB becomes large, so that the lower limit value is easily reached. Therefore, it may be difficult to control the charge and discharge power of the battery 59 to the required charge and discharge power Pd* by feedback control with high accuracy.

In view of this, in the present embodiment, the required engine output Pe* is increased or decreased by feedforward control with the start and end of the regeneration process, so that the traveling output Pp* can be controlled without being restricted by the charge and discharge power of the battery 59.

Further, in the present embodiment, the CPU 112 increases the required engine output Pe* with the start of the regeneration process, and sets the target engine rotation speed NE* accordingly. Therefore, as shown in FIG. 8, when the operation point of the internal combustion engine 10 is defined by the engine rotation speed NE and the filling efficiency η, both the engine rotation speed NE and the filling efficiency η are changed to a larger operation point with the start of the regeneration process.

Figure 8:
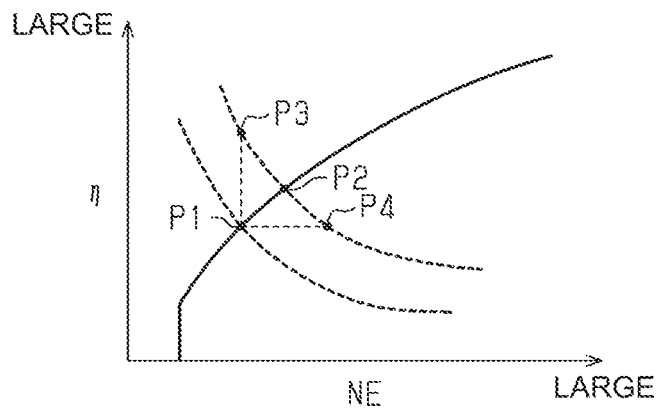
FIG. 8 is a graph illustrating a setting method of an operation point according to the first embodiment.

FIG. 8 shows an example of a transition from the operation point P1 before the start of the regeneration process to the operation point P2 with the execution of the regeneration process. In FIG. 8, the solid line shows a set of operation points that can be taken when the combustion control is executed in all of the cylinders #1 to #4. The dashed lines indicate equal output lines.

Here, to set the engine output Pe to the required engine output Pe*, the transition from the operation point P1 to the operation point P2 is not essential. For example, there is an option to expand the opening degree of the throttle valve 14 and transition from the operation point P1 to the operation point P3 without changing the target engine rotation speed NE*. However, in that case, when the filling efficiency η indicated by the operation point P1 before the transition is large or the like, it may be difficult to expand the filling efficiency η and to set the engine output Pe to the required engine output Pe*. Further, for example, there is an option to greatly increase the target engine rotation speed NE* and transition to the operation point P4 without changing the filling efficiency η. However, in that case, a level of noise perceived by the user is likely to occur.

According to the present embodiment described above, the operations and effects described below can be further obtained.

(1) In the HV ECU 110, the target engine rotation speed NE* is set, and feedback control of the engine rotation speed NE is performed to the target engine rotation speed NE*. In that case, when the ENG ECU 70 alone, which controls the internal combustion engine 10, compensates for the decrease in the output of the internal combustion engine 10 due to the regeneration process, only the increase in the filling efficiency η can be made. Therefore, it is particularly effective for the HV ECU 110 to set the target engine rotation speed NE* based on the required engine output Pe*, the amount of which is increased according to the value of the decrease variable RDp.

Second Embodiment

Hereinafter, the second embodiment will be described with reference to the drawings, focusing on the differences from the first embodiment.

In the first embodiment, the value obtained by dividing the number of cylinders in which combustion control is stopped by the total number of cylinders of the internal combustion engine 10 plus a predetermined amount δ is substituted into the decrease variable RDp. However, in the present embodiment, the value of the decrease variable RDp is calculated in consideration of the torque change due to the air-fuel ratio in the cylinder in which the combustion control is continued.

Figure 9:
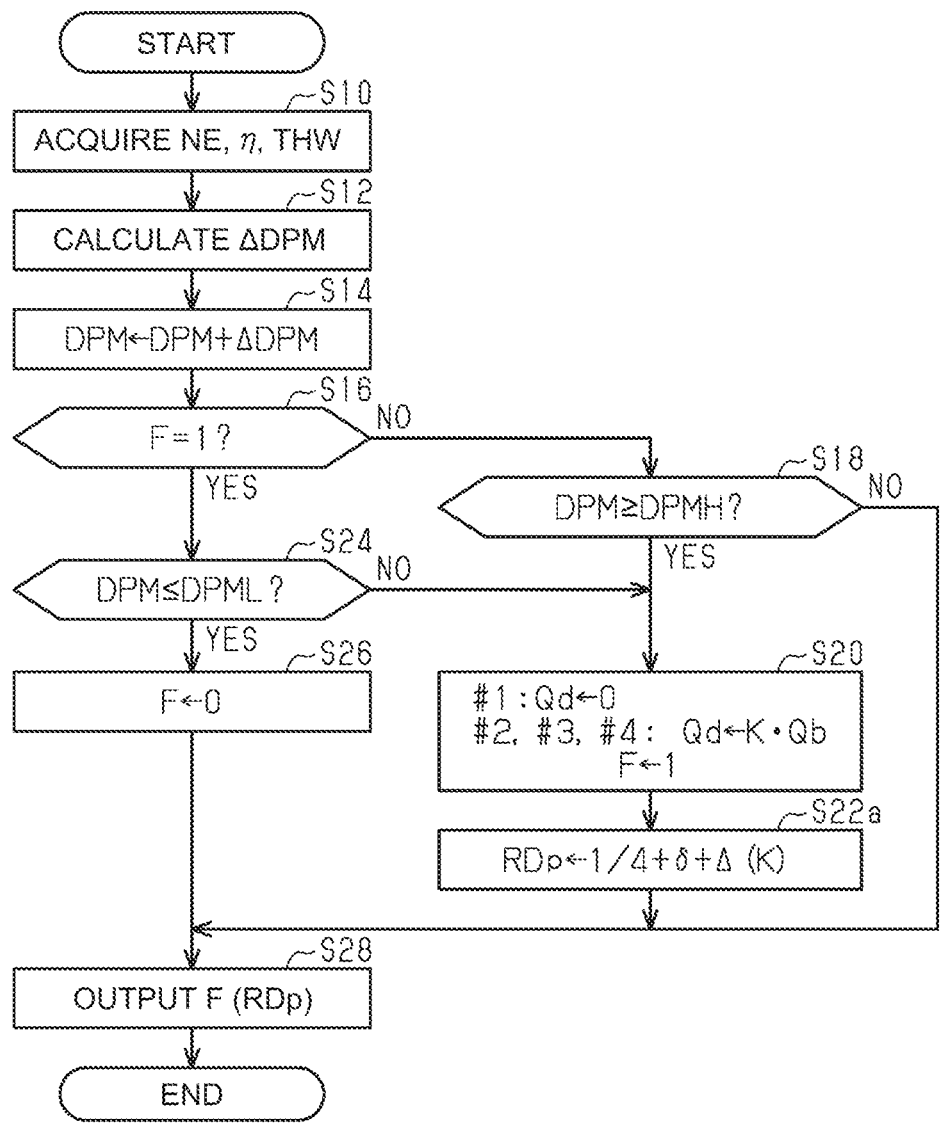
FIG. 9 is a flowchart showing a procedure of processes executed by a control system according to a second embodiment.

FIG. 9 shows the procedure of the regeneration process according to the present embodiment. The process shown in FIG. 9 is realized when the CPU 72 repeatedly executes the program stored in the ROM 74 of the ENG ECU 70, for example, at a predetermined cycle. In FIG. 9, for the process corresponding to the process shown in FIG. 2, the same step number is assigned and the description thereof will be omitted for convenience of description.

In the series of processes shown in FIG. 9, when the process of S20 is completed, the CPU 72 substitutes the value obtained by adding the predetermined amount δ and the air-fuel ratio correction amount Δ to "¼" into the decrease variable RDp (S22*a*). The CPU 72 calculates the air-fuel ratio correction amount Δ to a larger value as the increase coefficient K increases. This is a setting in view of the fact that when the air-fuel ratio is richer than the stoichiometric air-fuel ratio, the torque of the internal combustion engine 10 increases as the degree of richness increases until the output air-fuel ratio is reached.

When the process of S22*a* is completed, the CPU 72 shifts to the process of S28.

Figure 10:
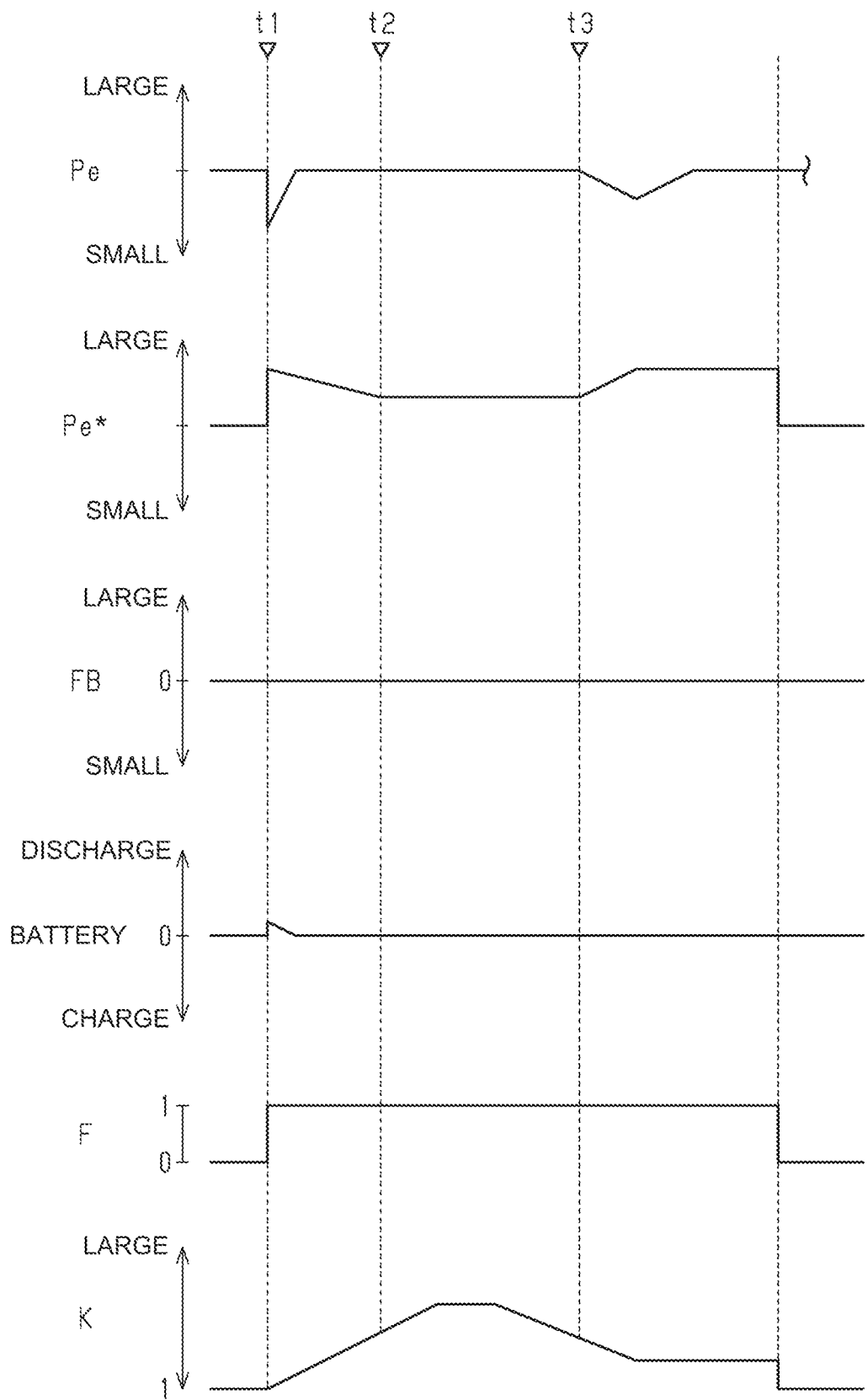
FIG. 10 is a time chart showing an operation of the second embodiment.

Here, the operation and effect of the present embodiment will be described. FIG. 10 illustrates transitions in the engine output Pe, the required engine output Pe*, the feedback correction amount FB, the charge and discharge state of the battery 59, the flag F, and the increase coefficient K according to the present embodiment.

As shown in FIG. 10, when the regeneration process is executed at time t1, the CPU 112 of the HV ECU 110 increases the required engine output Pe* based on the value of the decrease variable RDp. Then, the CPU 112 outputs the required engine output Pe* to the ENG ECU 70. The CPU 72 of the ENG ECU 70 calculates the engine required torque Te* according to the required engine output Pe*, and operates the throttle valve 14 based on the calculated engine required torque Te*.

Further, the CPU 72 reduces the air-fuel ratios of the air-fuel mixtures in the cylinders #2 to #4 from the stoichiometric air-fuel ratio with the start of the regeneration process to enrich the air-fuel ratios. Along with this, the CPU 72 gradually reduces the decrease variable RDp. Therefore, the required engine output Pe* calculated by the CPU 112 of the HV ECU 110 gradually decreases. This continues until time t2 when the air-fuel ratios of the air-fuel mixtures in the cylinders #2 to #4 decrease to the output air-fuel ratio.

After that, the CPU 72 gradually reduces the increase coefficient K to increase the air-fuel ratios of the air-fuel mixtures in the cylinders #2 to #4 in order to avoid the temperature of the GPF 34 from rising excessively. Therefore, at time t3 when the air-fuel ratios of the air-fuel mixtures in the cylinders #2 to #4 rise to the output air-fuel ratio and after, the required engine output base value Peb* calculated by the CPU 112 of the HV ECU 110 gradually increases.

As described above, in the present embodiment, the change in the torque of the internal combustion engine 10 due to the air-fuel ratios of the air-fuel mixtures in the cylinders in which the combustion control is continued is incorporated in the decrease variable RDp. As a result, the decrease variable RDp as the operation amount of the feedforward control that compensates for the fluctuation of the output due to the regeneration process can be calculated with higher accuracy.

Figure 11:
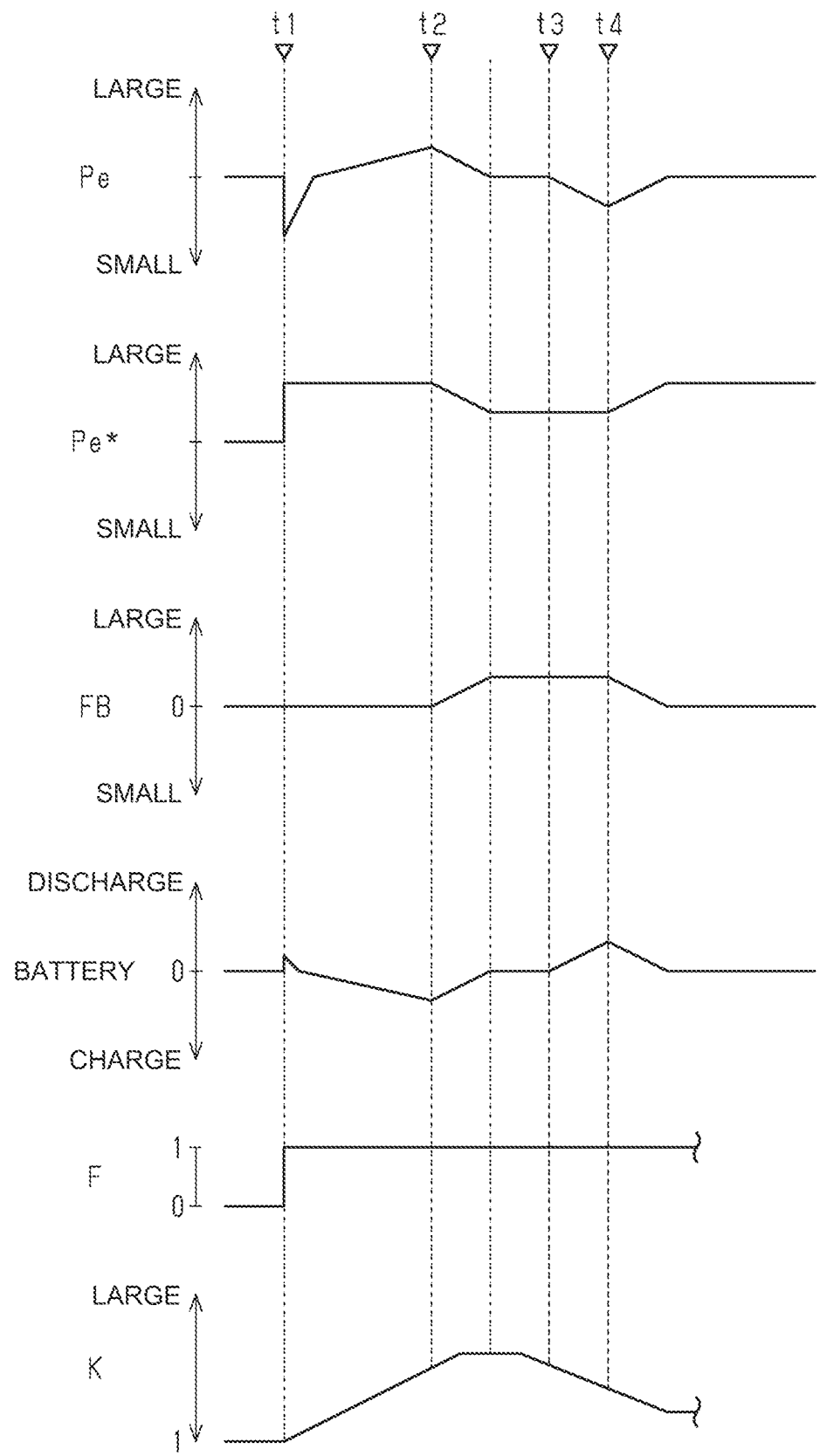
FIG. 11 is a time chart showing an operation of a comparative example.

In the transition example shown in FIG. 6, for convenience of description, the change in the torque of the internal combustion engine 10 due to the air-fuel ratios of the air-fuel mixtures in the cylinders in which the combustion control is continued is ignored. FIG. 11 shows a transition example incorporating the change in the torque of the internal combustion engine 10 due to the air-fuel ratios of the air-fuel mixtures in the cylinders in which the combustion control is continued.

As shown in FIG. 11, when the regeneration process is executed at time t1, the CPU 72 gradually increases the increase coefficient K with the start of the regeneration process. The required engine output Pe* is set based on the value of the decrease variable RDp that is appropriate when the air-fuel ratios of the air-fuel mixtures in the cylinders #2 to #4 are the stoichiometric air-fuel ratio. Therefore, the required engine output Pe* is excessive with respect to the value for keeping the engine output Pe at the required engine output base value Peb*. Thus, the engine output Pe gradually increases with the gradual increase of the increase coefficient K.

In that case, the engine rotation speed NE increases with respect to the target engine rotation speed NE*. Therefore, since the error err1 is negative and the absolute value increases, the absolute value of the first required torque Tmg1* increases. Thus, the direct torque Ted increases and the second required torque Tmg2* decreases. Therefore, as shown in FIG. 11, the charge power of the battery 59 increases.

When it is determined at time t2 that steady traveling is being performed, the feedback correction amount FB increases, so that the required engine output Pe* decreases. As a result, the engine output Pe decreases, and the charge power of the battery 59 decreases.

After that, the increase coefficient K gradually decreases, and the engine output Pe decreases at time t3 when the air-fuel ratios of the air-fuel mixtures in the cylinders #2 to #4 decrease to the output air-fuel ratio and after. In that case, since the error err1 increases, the absolute value of the first required torque Tmg1* decreases. Thus, the direct torque Ted decreases, and the second required torque Tmg2* increases. Therefore, as shown in FIG. 11, the discharge power of the battery 59 increases. When it is determined at time t4 that steady traveling is being performed, the feedback correction amount FB decreases, so that the required engine output Pe* increases. As a result, the engine output Pe increases, and the discharge power of the battery 59 decreases.

Correspondence

The correspondence between the matters in the above embodiment and the matters described in the above column of "summary" is as follows. In the following, the correspondence is shown for each number of the solution means described in the column of "summary". [1, 2] The stop process corresponds to the process of S20. The operation point change process corresponds to the process of S56, S58. [3] The required engine output setting process corresponds to the process of S30 to S52. The engine required torque setting process corresponds to the process of S82. The engine operation process corresponds to the process of S86. The engine base value setting process corresponds to the process of S30 to S44. The correction process corresponds to the process of S52. [4] The post-processing device corresponds to the GPF 34. The regeneration process and the rich combustion process correspond to the process of S20. The decrease variable calculation process corresponds to the process of S22, S22a. [5] The rotary electric machine corresponds to the second motor generator 54. [6] The planetary gear mechanism corresponds to the planetary gear mechanism 50. The first rotary electric machine corresponds to the first motor generator 52. The battery corresponds to the battery 59. The first rotation body corresponds to the sun gear S. The second rotation body corresponds to the ring gear R. The third rotation body corresponds to the carrier C. The feedback process corresponds to the process of S44.

Other Embodiments

The present embodiment can be modified and implemented as follows. The present embodiment and modification examples described below may be carried out in combination of each other within a technically consistent range.
Operation Unit for Adjusting Filling Efficiency
In the above embodiment, the throttle valve 14 is operated based on the engine required torque Te*, but the operation unit that adjusts the filling efficiency is not limited to this. For example, the operation unit that adjusts the filling efficiency may be a device that causes the valve characteristics of the intake valve 16 to be variable. Further, for example, the operation unit that adjusts the filling efficiency may be both the throttle valve 14 and the device that causes the valve characteristics of the intake valve 16 to be variable.
Operation Point Change Process
The operation point change process is not limited to the process of inputting the required engine output Pe* that has been increased according to the value of the decrease variable RDp to the process of calculating the operation point based on the required engine output Pe* when the regeneration process is not executed. Even when the operation point is set to be different from the operation point determined by the above process, when the operation point is such that both the filling efficiency η and the engine rotation speed NE are increased, the effect according to the above embodiment is obtained.
It is not essential to set the operation point where both the filling efficiency η and the engine rotation speed NE are increased. For example, setting the operation point where only the engine rotation speed NE is increased is effective in cases such as when the regeneration process is started at an operation point with a large filling efficiency η.
Feedback Process
In the above embodiment, the output value of the integration element using the value obtained by subtracting the actual charge and discharge power from the required charge and discharge power Pd* as the input is used as the feedback correction amount FB, but an applicable embodiment of the present disclosure is not limited to this. For example, the sum of the output value of the proportional element and the output value of the integration element of the subtracted value described above may be used as the feedback correction amount FB.
In the above embodiment, the feedback control based on the calculation of the feedback correction amount FB is executed only during steady traveling, but an applicable embodiment of the present disclosure is not limited to this.
It is not essential that the feedback correction amount FB constitutes the required engine output base value Peb*. For example, the final required engine output Pe* may be calculated by constantly defining the required engine output base value Peb* by the process of S42 and correcting the values calculated by the process of S48, S52 by the feedback correction amount FB.
Correction Process
The value of the decrease variable RDp may be set to "¼" or the like by calculating the decrease variable RDp omitting the predetermined amount δ.
As described in the column of "stop process" below, when multiple cylinders are subjected to the stop process, the value of the decrease variable RDp may be set based on, for example, "²⁄₄" or the like instead of "¼".
Compensation for Decrease in Output by Rotary Electric Machine
In the above embodiment, when the engine output Pe decreases due to the stop process, the decrease in the output is compensated by increasing the second required torque Tmg2* calculated in the process of S68. However, the compensation process for the decrease in the output by the rotary electric machine is not limited to this. For example, in the case of a parallel hybrid electric vehicle as described in the column of "vehicle" below, for example, the increase amount of the command value of the output of the rotary electric machine may be directly calculated by inputting the value of the decrease variable RDp.
Stop Process
The number of cylinders in which the combustion control is stopped is not limited to one.
The stop process is not limited to the regeneration process. For example, the stop process may be a process of stopping the supply of fuel in some cylinders in order to adjust the output of the internal combustion engine 10. Further, for example, when an abnormality occurs in some cylinders, the process may be a process of stopping the combustion control in those cylinders. Furthermore, for example, when the oxygen storage amount of the three-way catalyst 32 is equal to or less than the specified value, the stop process may be a process of stopping the combustion control only in some cylinders in order to supply oxygen to the three-way catalyst 32, and executing control to cause the air-fuel ratios of the air-fuel mixtures in the remaining cylinders to be the stoichiometric air-fuel ratio.
Post-Processing Device
The GPF 34 is not limited to the GPF provided downstream of the three-way catalyst 32 in the exhaust passage 30. Further, it is not essential that the post-processing device is provided with the GPF 34. The GPF 34 is not limited to a filter on which a three-way catalyst is supported. For example, when a three-way catalyst is provided upstream, the GPF 34 may be only a filter.

Vehicle Control System

The vehicle control system is not limited to a system composed of a plurality of electronic control units capable of communicating with each other. For example, the vehicle control system may be configured by a single electronic control unit.

The vehicle control system is not limited to a system that includes the CPUs 72, 112 and the ROMs 74, 114 and executes software processing. For example, the vehicle control system may include a dedicated hardware circuit such as an application-specific integrated circuit (ASIC) that performs hardware processing on at least a part of what has been subjected to software-processing in the above embodiment. That is, the vehicle control system only needs to include any of the following configurations (a) to (c). (a) A processing device that executes all of the above processes according to a program and a program storage device such as a ROM for storing the program (b) A processing device that executes a part of the above processes according to a program, a program storage device, and a dedicated hardware circuit for executing the remaining processes (c) A dedicated hardware circuit that executes all of the above processes Here, the number of the software execution devices provided with the processing device and the program storage device, and the number of the dedicated hardware circuits may be one or any plural number.

Vehicle

Instead of directly connecting the ring gear R and the second motor generator 54, a reduction gear may be interposed therebetween.

The hybrid electric vehicle is not limited to a series/parallel hybrid electric vehicle. For example, the hybrid electric vehicle may be a parallel hybrid electric vehicle. Even in this case, it is not always possible to compensate for the decrease in the output of the internal combustion engine 10 by the motor generator when the regeneration process or the like is performed, depending on the charge rate SOC or the like of the battery 59. Therefore, it is effective to increase the output of the internal combustion engine 10 in the manner of the above embodiment.

The vehicle is not limited to a hybrid electric vehicle. For example, the vehicle may be a vehicle provided with only the internal combustion engine 10 as a thrust generation device.

What is claimed is:

1. A vehicle control system that is applied to a vehicle including an internal combustion engine including a plurality of cylinders, and that executes a stop process and an operation point change process, wherein:
   the stop process is a process for stopping combustion control in some of the cylinders;
   the operation point change process is a process of changing an operation point of the internal combustion engine when the stop process is executed;
   the operation point is a point defined by a rotation speed of a crank shaft of the internal combustion engine and a filling efficiency; and
   the operation point changed in the operation point change process is an operation point in which the rotation speed of the crank shaft of the internal combustion engine is higher than the rotation speed of the crank shaft of the internal combustion engine when the operation point is not changed.

2. The vehicle control system according to claim 1, wherein the operation point changed in the operation point change process is an operation point in which both the rotation speed of the crank shaft and the filling efficiency are higher than the rotation speed of the crank shaft and the filling efficiency when the operation point is not changed.

3. The vehicle control system according to claim 2, wherein:
   the vehicle control system executes a required engine output setting process and an engine operation process;
   the required engine output setting process includes an engine base value setting process and a correction process;
   the engine base value setting process is a process of setting a base value of a required engine output according to an accelerator operation amount, the required engine output being an output required for the internal combustion engine;
   the correction process is a process of increasing and correcting the required engine output with respect to the base value when the stop process is executed; and
   the engine operation process is a process of operating an operation unit of the internal combustion engine that adjusts the filling efficiency according to the required engine output.

4. The vehicle control system according to claim 3, wherein:
   the internal combustion engine includes a post-processing device in an exhaust passage;
   the vehicle control system executes a regeneration process of the post-processing device and a decrease variable calculation process;
   the regeneration process includes the stop process and a rich combustion process;
   the rich combustion process is a process of adjusting a degree of enrichment of an air-fuel ratio of an air-fuel mixture in a cylinder not subjected to the stop process among the cylinders according to a temperature of the post-processing device;
   the decrease variable calculation process is a process of calculating a value of a decrease variable according to the degree of enrichment;
   the decrease variable is a variable indicating an amount of decrease in an output of the internal combustion engine due to the regeneration process; and
   the correction process is a process of increasing and correcting the required engine output with respect to the base value according to the value of the decrease variable.

5. The vehicle control system according to claim 3, wherein:
   the vehicle includes a rotary electric machine; and
   power of the internal combustion engine and power of the rotary electric machine are considered applicable to drive wheels.

6. The vehicle control system according to claim 5, wherein:
   the rotary electric machine is a second rotary electric machine;
   the vehicle includes a planetary gear mechanism, a first rotary electric machine, and a battery;
   the planetary gear mechanism includes a first rotation body, a second rotation body, and a third rotation body;

the first rotation body is mechanically connected to a rotation shaft of the first rotary electric machine;

the second rotation body is mechanically connected to a rotation shaft of the second rotary electric machine;

the third rotation body is mechanically connected to the crank shaft of the internal combustion engine;

the first rotation body and the third rotation body are mechanically connected to the drive wheels via the second rotation body;

the battery exchanges electric power with the first rotary electric machine and the second rotary electric machine;

the engine base value setting process is a process of setting the base value according to required charge and discharge power for the battery as well as the accelerator operation amount;

the required engine output setting process includes a feedback process; and the feedback process is a process of operating the required engine output to perform feedback control of an actual charge and discharge power of the battery to the required charge and discharge power.

\* \* \* \* \*